US009482295B2

(12) United States Patent
Storti (10) Patent No.: US 9,482,295 B2
(45) Date of Patent: Nov. 1, 2016

(54) GEAR-SHIFTING DEVICE FOR MEANS OF TRANSPORT

(71) Applicant: SIRAL S.R.L., Recoaro Terme (Vicenza) (IT)

(72) Inventor: Fabrizio Storti, Recoaro Terme (IT)

(73) Assignee: SIRAL S.R.L., Recoaro Terme (IT)

( * ) Notice: Subject to any disclaimer, the term of this patent is extended or adjusted under 35 U.S.C. 154(b) by 33 days.

(21) Appl. No.: 14/561,975

(22) Filed: Dec. 5, 2014

(65) Prior Publication Data

US 2015/0159736 A1 Jun. 11, 2015

(30) Foreign Application Priority Data

Dec. 9, 2013 (IT) .............................. VR2013A0272

(51) Int. Cl.
| | |
|---|---|
| *F16H 3/20* | (2006.01) |
| *F16H 3/08* | (2006.01) |
| *F16D 41/06* | (2006.01) |
| *F16H 63/30* | (2006.01) |
| *F16H 3/089* | (2006.01) |
| *F16D 41/08* | (2006.01) |
| *B62M 11/06* | (2006.01) |

(52) U.S. Cl.
CPC ............ *F16D 41/06* (2013.01); *F16D 41/088* (2013.01); *F16H 3/089* (2013.01); *F16H 63/30* (2013.01); *B62M 11/06* (2013.01); *F16H 2063/3093* (2013.01); *F16H 2200/006* (2013.01); *Y10T 74/19242* (2015.01)

(58) Field of Classification Search
CPC ........... F16H 3/363; F16H 3/423; F16H 3/34
USPC .......................................... 74/331, 333, 349
See application file for complete search history.

(56) References Cited

U.S. PATENT DOCUMENTS

| 5,689,998 | A | * | 11/1997 | Lee ........................ F16H 3/083 |
| | | | | 475/150 |
| 7,240,779 | B2 | | 7/2007 | Facchini |
| 8,042,421 | B2 | * | 10/2011 | Matsumoto ............ F16H 3/083 |
| | | | | 192/48.7 |
| 2005/0173217 | A1 | | 8/2005 | Facchini |
| 2008/0098843 | A1 | * | 5/2008 | Hemphill ................ F16D 21/04 |
| | | | | 74/473.11 |
| 2010/0162841 | A1 | | 7/2010 | Cavalerie |

FOREIGN PATENT DOCUMENTS

| WO | 03104672 A1 | 12/2003 |
| WO | 2008142219 A2 | 11/2008 |
| WO | 2012156613 A1 | 11/2012 |

* cited by examiner

*Primary Examiner* — Ha D Ho
(74) *Attorney, Agent, or Firm* — Pearne & Gordon LLP (57) ABSTRACT

A gear-shifting device (1) for means of transport including a pair of shafts (20-30) each including a plurality of transmission units (200) wherein each transmission unit (200) of a shaft (30) is rotated by a respective transmission unit (200) of the other shaft (20) wherein the shaft (30) is an activation shaft. The activation shaft (30) includes activation means (40) configured in such a way as to selectively rotate in an integral fashion a transmission unit (200) of the shaft (20) with a transmission unit (200) of the activation shaft (30) by generating a transient difference in speed of rotation between the slowing disk (45) operatively connected to the transmission unit (200) of the shaft (30) and the transmission unit (200) of the shaft (30). The transmission units (200) of the activation shaft (30) rotate freely relative to the activation shaft (30) in a selected configuration of the transmission unit (200).

17 Claims, 7 Drawing Sheets

GEAR-SHIFTING DEVICE FOR MEANS OF TRANSPORT

FIELD OF THE INVENTION

This invention relates to a gear-shifting device for means of transport. In other words, this invention relates to a device for selecting a ratio in a gear-shifting device for means of transport.

Preferably, this invention is applied on bicycles and, therefore, it will be referred to below mainly as a gear-shifting device for bicycles. In any case, it should be noted that the gear-shifting device could be applied on any means of transport such as, for example, motorised vehicles or non-motorised vehicles.

More specifically, this invention relates to a gear-shifting device for bicycles designed both purely for use on urban and/or smooth roads with slight gradients and for extreme/sports use, that is, for bicycles designed for use on very rough terrain, such as on cobble stones, bridleways or dirt or grass tracks.

BACKGROUND ART

In the prior art, bicycles are usually equipped with a gear-shifting device to make the use of the bicycle more efficient.

There are bicycles equipped with a first prior art gear-shifting device comprising a series of gear wheels divided into two groups: a group associated with the shaft positioned on the axis of the pedal cranks of the bicycle and a group, which are generally more numerous, associated with the hub of the drive wheel (the rear). A mechanical transmission chain puts into mechanical contact the two groups of gear wheels.

Generally speaking, the gear wheels of the two groups are keyed parallel to each other on the hubs in such a way that a transversal movement of the transmission chain from one gear wheel to the other determines the change of the transmission ratio. The chain is generally made to translate by a user on the gear wheels of a group or simultaneously on both the groups allowing an increase and/or decrease in the speed of the bicycle, precisely because the transmission ratio between the shaft of the pedal cranks (driving axis) and the hub of the drive wheel (driven axis) is changed.

A gear-shifting device of the type mentioned above comprises at least one derailleur which is movable by means of quadrilateral linkages driven mechanically, for example by a flexible sheathed steel wire, in such a way as to move in sequence to a gear wheel selected for setting the selected transmission ratio.

In the prior art, a second type of gear-shifting device exists comprising a group of shafts divided between a primary input shaft, a secondary shaft and a tertiary output shaft and which makes it possible to have a greater degree of compactness of the transmission system relative to the derailleurs system.

As for example described in patent WO 2012/156613, a gear device of this kind has the gear wheels of the secondary shaft free to rotate relative to it except in a selection condition of a gear wheel which, temporarily and reversibly, is engaged on the secondary shaft, allowing a rigid mechanical connection between the primary shaft and the tertiary shaft.

In the second prior art type of gear-shifting device the mechanical connection between primary shaft and secondary shaft in general corresponds to a gear having a transmission ratio which is predetermined and cannot be converted as it is established during the design. The transmission ratio is therefore established with a meshing of a pair of gear wheels belonging, respectively, to the secondary shaft and to the tertiary shaft.

For this type of gear-shifting device it is known that the engaging of a gear wheel of the secondary shaft with a respective gear wheel keyed on the tertiary shaft occurs with a snap-in engaging system, comprising, for example, a slider, also called "shuttle", which slides inside the secondary shaft which is hollow inside.

The slider is positioned at a gear wheel, sliding inside the secondary shaft and allows the engaging on the respective shaft keeping mechanically connected the primary shaft with the tertiary shaft, precisely through the secondary shaft.

In this way, as well as having established a mechanical connection between the input and output (respectively, between the pedal cranks of the bicycle and the pinion of the transmission chain), a predetermined and defined transmission ratio has been established by the user by engaging the selected gear wheel on the respective secondary shaft.

The change from one transmission ratio to a new one occurs by sliding the slider inside the cavity of the secondary shaft to the new predetermined position, and therefore to the new transmission ratio.

The slider or shuttle is moved inside the cavity of the shaft by using mechanical type transfer means, of a more or less elaborate and sophisticated nature.

In a different prior art solution, for example in patent WO 2008/142219, the gear-shifting device always comprises three shafts interacting with each other, of which at least one is coaxial with a second shaft, in particular the primary shaft is coaxial with the tertiary shaft and they are independent during the rotation by interposing rolling bearings. The shaft secondary is parallel and positioned in the proximity of the first two shafts. This variant embodiment of the gear-shifting device comprises, similarly to what is described above, the operation of a "shuttle" slider which, sliding inside a cavity made in the secondary shaft, allows the selection of a gear wheel which, after engaging on the shaft, allows the rotational movement between the primary shaft (input) and the tertiary shaft (output) by means of a suitable transmission ratio.

According to the prior art, the gear-shifting devices for bicycles have some drawbacks which limit the use both in performance and sector application terms.

In the case of a gear-shifting device of the derailleur type, the system comprises quadrilateral linkages which require a precise setting up and a programmed adjustment and maintenance after a certain time of use and/or mileage of the bicycle.

Depending on the amount of use (intense or normal), the derailleur gear-shifting device can have slight problems (increasingly long gear-shift times, gear shifts less precise), until more serious problems occur of excessive wear or failure of certain more highly stressed mechanical parts. Sometimes, the transmission chain breaks.

Moreover, the times for changing the ratio of a derailleur gear-shifting device are rather to long for a good use of the bicycle.

In effect, the gear shift times of the derailleur gear-shifting device constitute an important limitation which often impacts on the comfort of the user who is forced to reduce the force transmitted during pedalling, therefore accompanying the rotation of the transmission chain to favour the engaging of the new transmission ratio.

During this step, which lasts a few seconds, the user is forced to pedal without delivering the force which would normally be exerted to move forward at the predetermined speed, thus losing speed and increasing the physical effort due to the subsequent recapturing step.

Another drawback regarding this type of gear-shifting device is the exposure of its components to atmospheric conditions, such as rain, dust, mud and detritus, which can obstruct and/or block the movement between some parts of the gear-shifting device.

Often, during a situation of very harsh and continuous use of the bicycle, the gear-shifting device described above may suffer from nearly all the above-mentioned drawbacks.

The second prior art type of gear-shifting device also suffers from several problems especially in terms of gear shift times which are incompatible with an intensive use of the gear-shifting device and the bicycle.

This drawback can put the user in difficulty as he/she is forced to slow down considerably, immediately change gear and then recover the distance lost with greater effort and force.

In general, a gear-shifting device of this kind is mechanically more delicate; in effect the device in question is not free of failures and breakages especially of the system for driving the "shuttle" slider, an event which would completely put the gear-shifting device out of use as it would remain locked in a single transmission ratio of the bicycle or in an intermediate position between two selection positions which would not allow the engaging of any transmission ratio.

In addition, the gear-shifting device may be bulky and heavy.

DISCLOSURE OF THE INVENTION

In this context, the technical purpose of this invention is to provide a gear-shifting device for means of transport to overcome the above mentioned drawbacks.

More specifically, the aim of this invention is to provide a gear-shifting device for means of transport which allows the transmission ratio to be changed more quickly than in the prior art.

It is also aim of this invention is to provide a gear-shifting device for means of transport which allows a greater efficiency in terms of energy used by the user compared with that effectively delivered to the hub of the drive wheel of the bicycle.

Moreover, another aim of this invention is to provide a bicycle which allows a more efficient use of the gear-shifting device especially in the presence of significant gradients, considerable differences in drive torque and/or sudden and frequent changes of the transmission ratio.

These and other aims are substantially achieved by a gear-shifting device for means of transport as described in one or more of the appended claims. The dependent claims correspond to possible embodiments of the invention.

Further features and advantages of the present invention are more apparent from the detailed description of a preferred, but non-exclusive, embodiment of a gear-shifting device for means of transport according to this invention.

BRIEF DESCRIPTION OF THE DRAWINGS

The description is provided below with reference to the accompanying drawings, which are also non-limiting and provided by way of example only, in which.

The accompanying drawings show in its entirety a gear-shifting device for means of transport in more than one embodiment according to the inventive concept of this invention.

The gear-shifting device, which will hereafter be referred to as "device", is labelled in its entirety in the accompanying drawings with the numeral 1.

DETAILED DESCRIPTION OF THE PREFERRED EMBODIMENTS OF THE INVENTION

According to the preferred embodiment of this invention, illustrated in the accompanying drawings, the device 1 comprises a primary shaft 10, a secondary shaft 20 and a tertiary shaft 30.

The primary shaft 10 has at least one end 11 designed to act as input for moving the shaft 10 by a pair of external forces, that is, forces transmitted/active between/from elements which may not be directly included in the device 1 according to a preferred embodiment of the invention. For example, the primary shaft 10 may have two input ends 11 to which may be fixed bicycle pedal cranks 300 (see FIG. 5 or FIG. 6).

With reference again to the preferred embodiment of the invention, the primary shaft 10 comprises a pinion 12, that is, a gear wheel, keyed onto the primary shaft 10. The pinion 12 is rigidly connected to the primary shaft 10 in such a way that they transmit a pair of forces between shaft 10 and pinion 12 during the operation of the device 1. The primary shaft 10 rotates about its own axis of rotation "X".

The secondary shaft 20 of the device 1 has a relative axis of rotation "Y" positioned parallel to the axis of rotation "X" of the primary shaft 10. In the example illustrated in FIG. 1 the axis of rotation Y is spaced from the axis of rotation X.

Preferably, the secondary shaft 20 comprises a plurality of transmission means 200, in particular a series of gear wheels 21 arranged in an ordered sequence along the axis "Y" of the secondary shaft 20.

Preferably, according to a possible embodiment for example illustrated in the drawings, the gear wheels 21 are keyed on the secondary shaft 20 in such a way as to be constantly rotatable in an integral fashion with the secondary shaft 20. For example, the shaft 20 may have along its outer surface longitudinal grooves which allow the gear wheels 21 to be fitted axially during assembly and to transmit a pair of forces between shaft 20 and gear wheels 21 during the operation of the device 1.

More specifically, the sequence of the gear wheels 21 may be ordered along the axis Y in an increasing or decreasing fashion in terms of dimensions and/or number of teeth of each gear wheel 21. Alternatively, the sequence of the gear wheels 21 may be ordered along the axis Y in such a way as to define a double cone or similar geometrical figures or other shape not expressly described herein.

Preferably, the secondary shaft 20 at one end 22 comprises a pinion 23 keyed on the shaft 20 and having dimensional and mechanical features which can be different from the plurality of gear wheels 21 adjacent to it.

Figure 1:
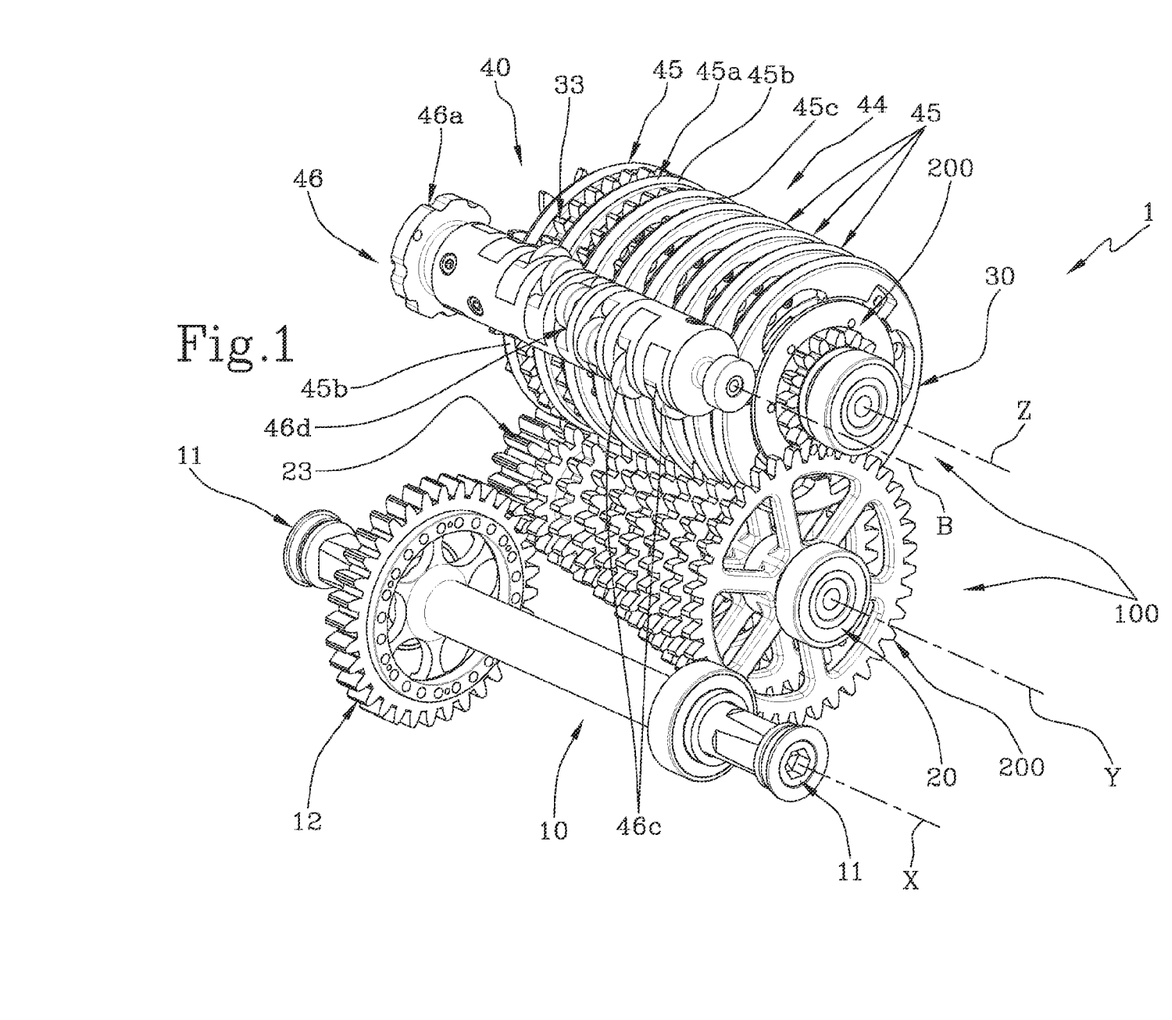
FIG. 1 is a schematic perspective view of the gear-shifting device in an embodiment according to this invention.
Figure 1A:
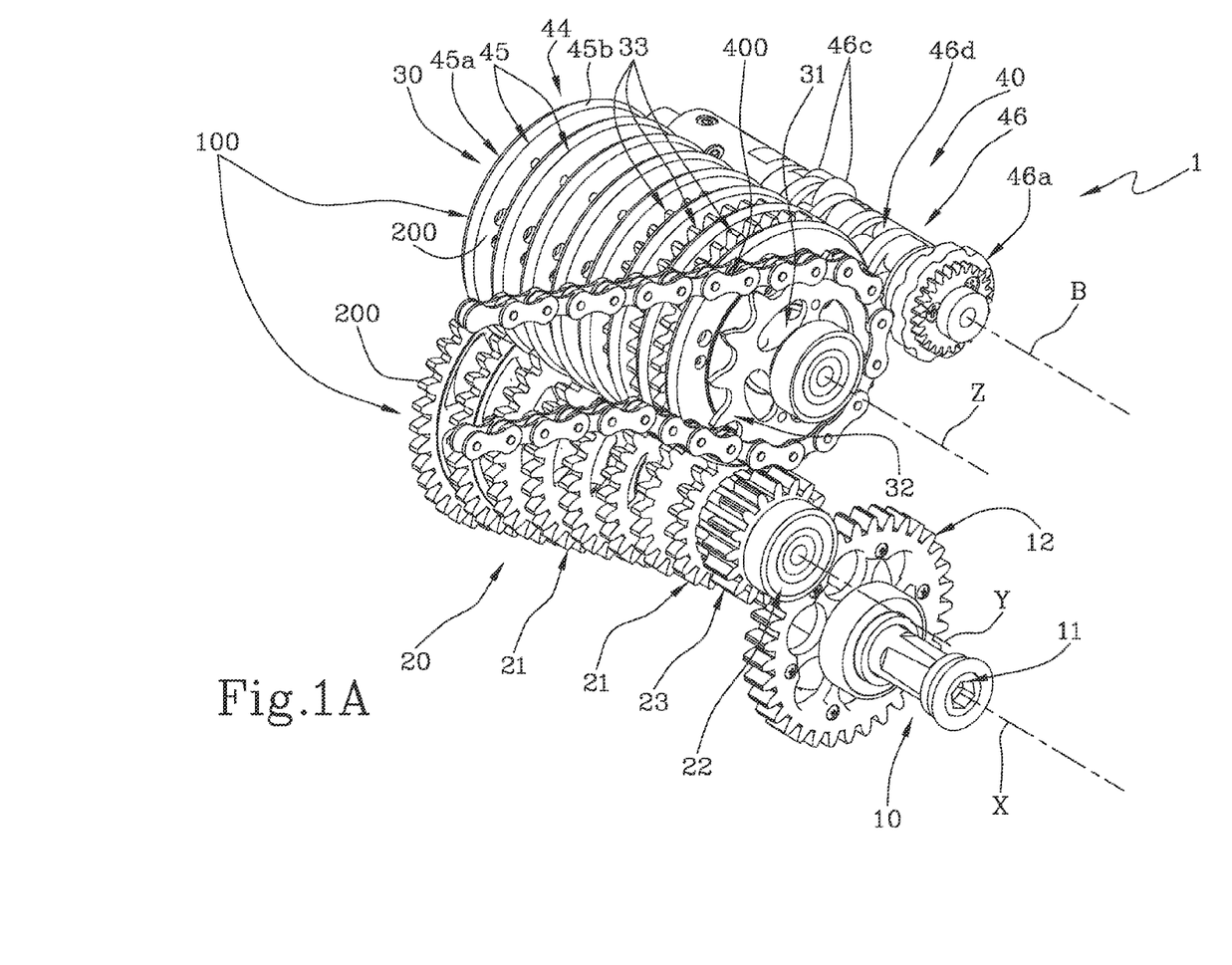
FIG. 1A is a different schematic perspective view of the gear-shifting device of FIG. 1.
Figure 6:
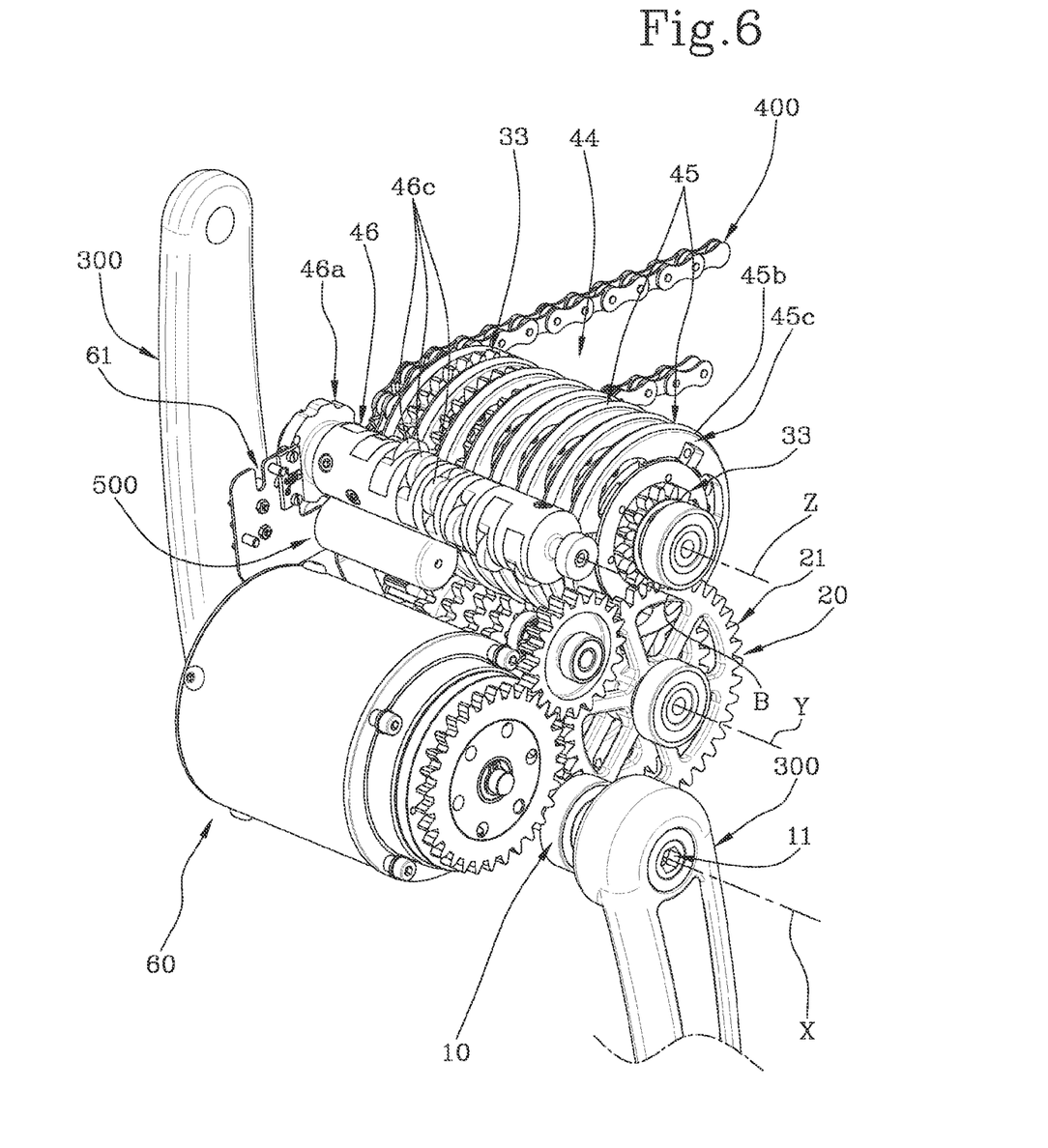
FIG. 6 is a schematic perspective view of the gear-shifting device in a different embodiment according to this invention.

According to one embodiment for example illustrated in FIGS. 1-1A and 6, the sequence of the gear wheels 21 may be ordered along the axis Y in an increasing or decreasing fashion in terms of dimensions and/or number of teeth of each gear wheel 21 starting from the pinion 23.

More specifically, the pinion 23 of the secondary shaft 20 is suitable for meshing, with the pinion 12 of the primary shaft 10.

The meshing of the pinion 12 of the primary shaft 10 with the pinion 23 of the secondary shaft 20 makes it possible to drive the movement of the secondary shaft 20, when the primary shaft 10 is driven by, for example, the external forces acting on the bicycle pedal cranks 300.

According to this embodiment, the tertiary shaft 30 has a relative axis of rotation "Z". Preferably, the axis "Z" is positioned parallel to the axis of rotation "Y" of the secondary shaft 20. In the embodiment illustrated, the tertiary shaft 30 is parallel also to the primary axis 10. In the example illustrated in FIG. 1 the axis of rotation Z is spaced from the axis of rotation X and from the axis of rotation Y.

Figure 3:
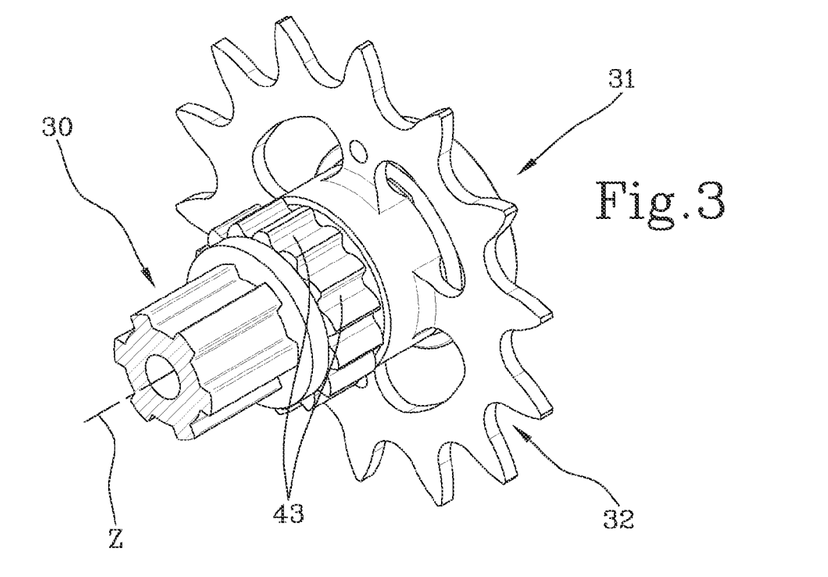
FIG. 3 is a schematic cross section perspective view of a different component of the gear-shifting device of FIG. 1 with some parts not illustrated to better illustrate others.

Preferably, the tertiary shaft 30 has on a relative end 31 an output pinion 32 from the device 1, as illustrated in FIGS. 1A and 1*n* FIG. 3.

Preferably, the output pinion 32 may be a gear wheel designed to mesh with a transmission chain 400, in particular a bicycle chain 400, as shown in FIG. 1A, directly to the drive wheel of the bicycle.

The tertiary shaft 30 comprises a plurality of transmission units 200, in particular a series of gear wheels 33 arranged in an ordered sequence along the axis "Z" of the shaft 30.

Preferably, the number of gear wheels 33 of the set of the tertiary shaft 30 is equal to the number of gear wheels 21 of the set of the secondary shaft 20. Preferably, the number of gear wheels 21, 33 of each set of the secondary shaft 20 and tertiary shaft 30 is between a minimum of 2 wheels and a maximum of 20 wheels, still more preferably, the number of gear wheels of each set is equal to 10 gear wheels.

The number of transmission ratios achievable by the device 1 is equal to the number of gear wheels 21, 33 of the respective series of the secondary shaft 20 and of the tertiary shaft 30.

Preferably, the ordered sequence of gear wheels 33 depends on the ordered sequence of gear wheels 21 of the secondary shaft 20, in particular the ordered sequence of gear wheels 33 is made in an increasing or decreasing fashion in terms of dimensions and/or number of teeth of each gear wheel 33.

In other words, with reference to respective ends of the same side of the secondary shaft 20 and tertiary shaft 30, if the set of gear wheels 21 of the secondary shaft 20 is of the increasing type, the set of gear wheels 33 of the tertiary shaft 30 associated with them is of the decreasing type or vice versa.

Alternatively, the sequence of gear wheels 33 might not be shaped to match the sequence of gear wheels 21 and have a respective shape, but at least part of the gear wheels 33 are meshed with the gear wheels 21. Each gear wheel 30 of the tertiary shaft 33 is positioned axially at a respective gear wheel 21 of the secondary shaft 20 in such a way that meshing with each other they can establish a predetermined transmission ratio between the secondary shaft 20 (the driving shaft) and the tertiary shaft 30 (the driven shaft). The ratio is selectively inserted each time in an operating configuration of the device 1, as described below.

With reference to FIG. 1, preferably each gear wheel 30 of the tertiary shaft 33 can rotate freely relative to the tertiary shaft in a non-selected configuration of the gear wheel.

Moreover, during an operating configuration of the device 1, the secondary shaft 20 and all the respective gear wheels 21 are rotatable in an integral fashion with each other, whilst only a gear wheel 33 of the tertiary shaft 30 is rotated by the respective gear wheel 21 of the secondary shaft 20 and, if the gear wheel 33 has been engaged on the shaft 30, the gear wheel 33 is rotatably integral with the respective tertiary shaft 30.

So that a single and predetermined transmission ratio is established between the secondary shaft 20 and the tertiary shaft 30 preferably the transmission performed by each pair of gear wheels 21, 33 can be inserted selectively so as to establish a reversible connection, rotatably integral with the respective shaft 20, 30.

The device 1 comprises activation means 40 designed for selecting the pair of gear wheels 21, 33 respectively belonging to the secondary shaft 20 and to the tertiary shaft 30, to establish a predetermined transmission ratio between input 11 and output 32 from the device 1.

The activation means may comprise a coupling system with reversible connection, which, using an external force, slows down its movement relative to the tertiary axis 30 and the pair of gears 21, 33 selected and engages a gripping element in a seat designed to allow rigid connection of the gear wheel to the shaft.

The coupling system with reversible connection is configured in such a way that if the above-mentioned external force (defined by a difference in speed) is not active between shaft and gear wheel (connected to the slowing disk 45), the gear wheel is normally freely rotatably relative to the shaft in both directions of rotation. In other words, the deactivated configuration of the engagement element is the normal condition, at rest, of the engagement system.

For example, the engagement element is fixed to the gear wheel and comprises elements shaped to engage in a cavity made on the shaft: normally, the deactivated position of the engagement element is maintained by an elastic element.

If the application of a slowing down between the slowing disk 45 and the respective gear wheel 33 is such as to exceed the action of the elastic element, the engagement element moves carrying the shaped elements in the seat provided on the shaft: in this configuration the respective gear wheel 33 and the shaft 30 are rotatably integral with each other. The action of the elastic element in the absence of the slowing down of the slowing disk 45 makes it possible to restore the normal configuration wherein the shaft and gear wheel are rotatably separate.

For the sake of a simple description, the shaft which comprises this engagement system between the stem of the shaft and the respective gear wheels will be referred to below and in the accompanying claims as the tertiary shaft.

For example, a coupling system with reversible connection similar to that described above is shown and described in patent document WO 03/104672 which is incorporated herein by reference in the part which describes the structure and operation. Moreover, an example of the coupling system with reversible connection is illustrated in FIGS. 4 and 5.

A preferred embodiment of the invention wherein the activation means 40 act on the tertiary shaft 30. In other words, FIG. 5 illustrates an embodiment of the above-mentioned tertiary shaft 30.

Figure 4:
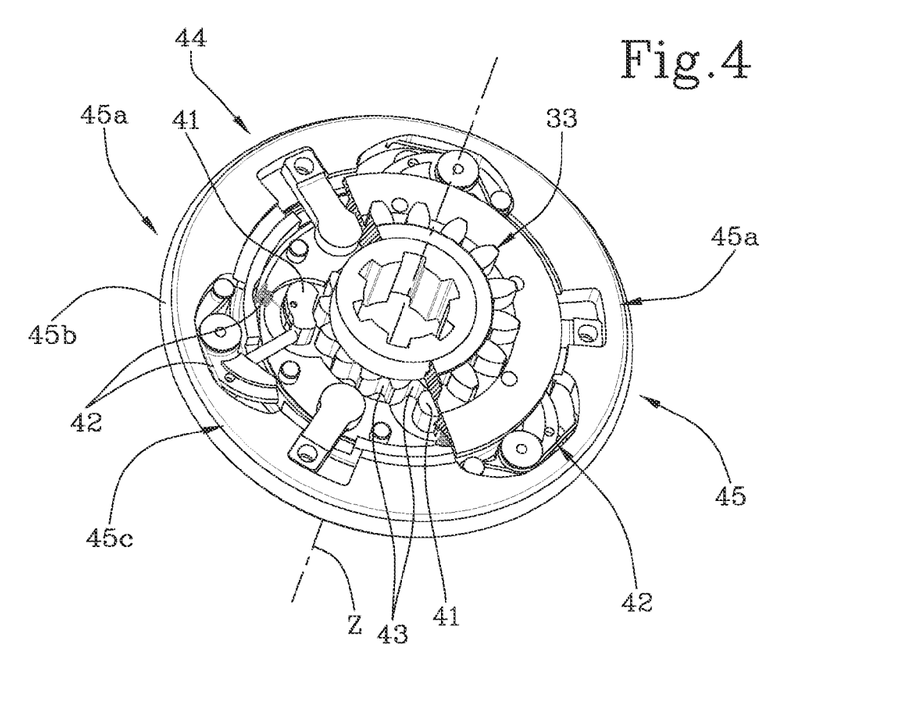
FIG. 4 is a schematic perspective view of a further and different component of the gear-shifting device of FIG. 1 with some parts not illustrated to better illustrate others.
Figure 5:
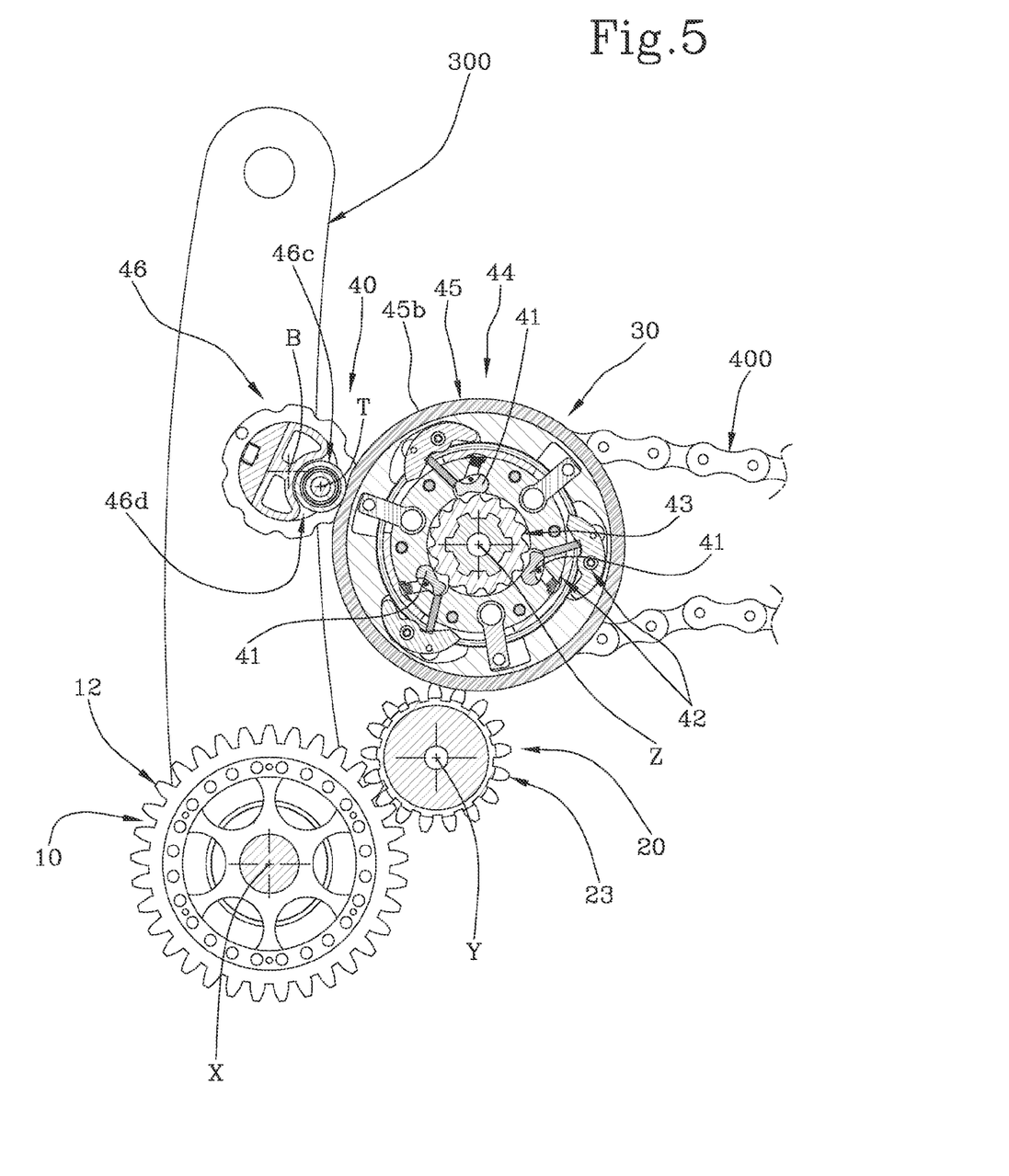
FIG. 5 is a schematic cross section perspective view of an operating condition of the gear-shifting device of FIG. 1.

More specifically, with reference to FIGS. 4 and 5, the pickup elements 41 are connected to each gear wheel 33 of the tertiary shaft 30. The tertiary shaft 30 has at each gear wheel 33 a cavity 43 shaped in such a way as to receive at least one portion of the engagement element 41 when there is an engaged configuration of the engagement element 41 on the tertiary shaft 30. At least one elastic element 42 controls the movement of the pick up element 41 to and from the respective shaped seat 43 of the tertiary shaft 30.

Preferably, the activation means 40 also comprise a slowing disk 45 operatively connected to a respective gear wheel 33 of the tertiary shaft 30. Each slowing disk 45 is rotatably mobile relative to the respective gear wheel 33 about the tertiary shaft 30 between a first position and a second position.

More specifically, each slowing disk 45 is configured in such a way as to selectively rotate in an integral fashion the respective gear wheel 33 with the tertiary shaft 30 by generating a transient difference in speed of rotation between the selected gear wheel 33 and the respective slowing disk 45 in such a way as to move the latter from the first position to the second position where the latter activates the elements shaped so as to render integral the gear wheel 33 with the tertiary shaft 30. Preferably, the elastic element 42 is designed to keep the slowing disk 45 in the first position.

In other words, each gear wheel 30 of the shaft 33 (therefore, of the tertiary shaft 30) is associated with a respective slowing disk 45 preferably fixed to the respective gear wheel 33 by screws and/or centring pins or similar systems.

The activation means 40 also comprise a drum 46 rotating about an axis "B", preferably parallel to the axis of rotation "Z" of the tertiary shaft sector 30.

Preferably, the drum 46 is cylindrical in shape and extends along the relative axis of rotation "B" at least for a length equal to the length of the set of gear wheels 33 positioned on the tertiary shaft 30.

Figure 2:
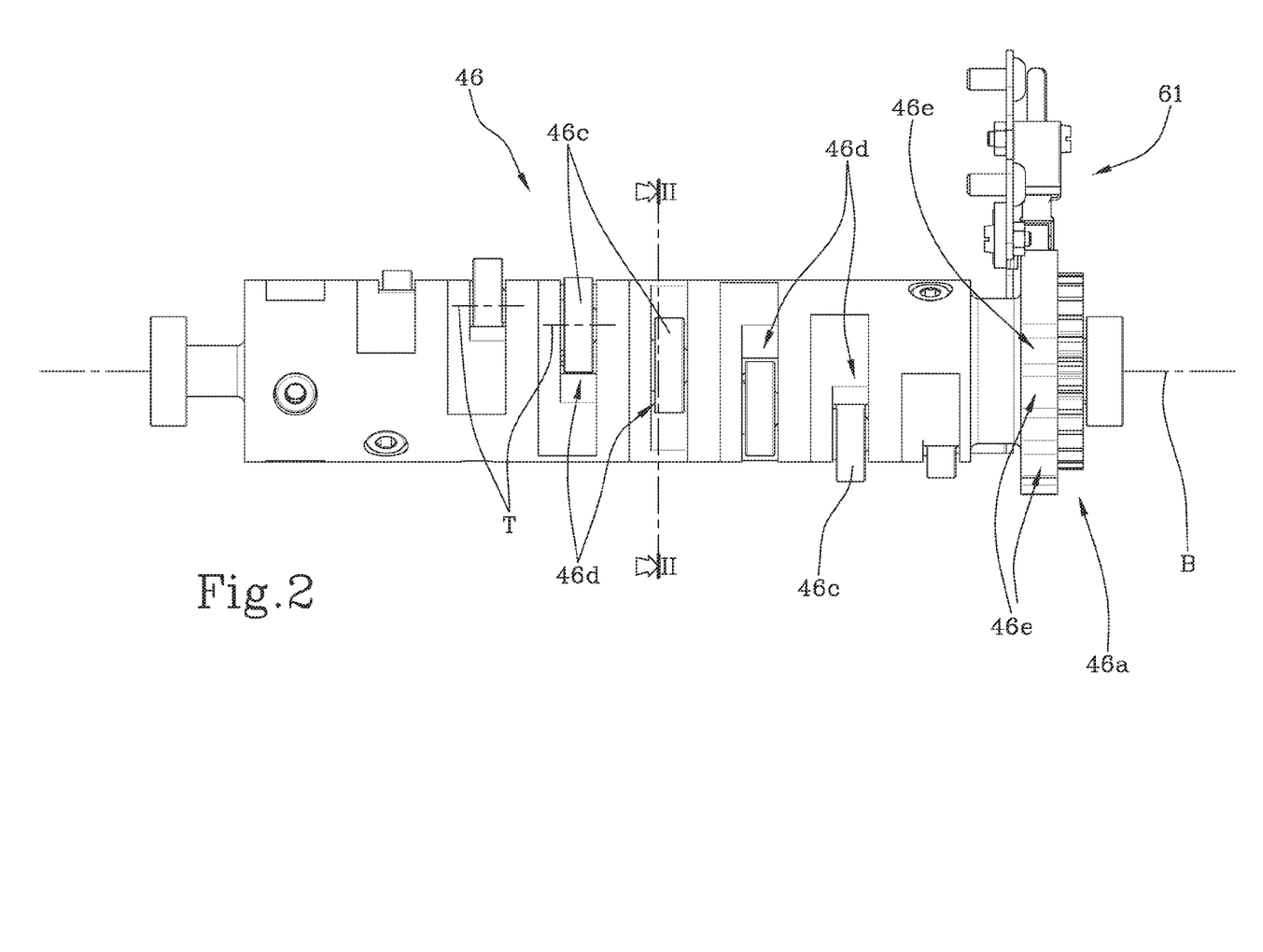
FIG. 2 is a schematic plan view of a component of the gear-shifting device of FIG. 1 with some parts not illustrated to better illustrate others.
Figure 2A:
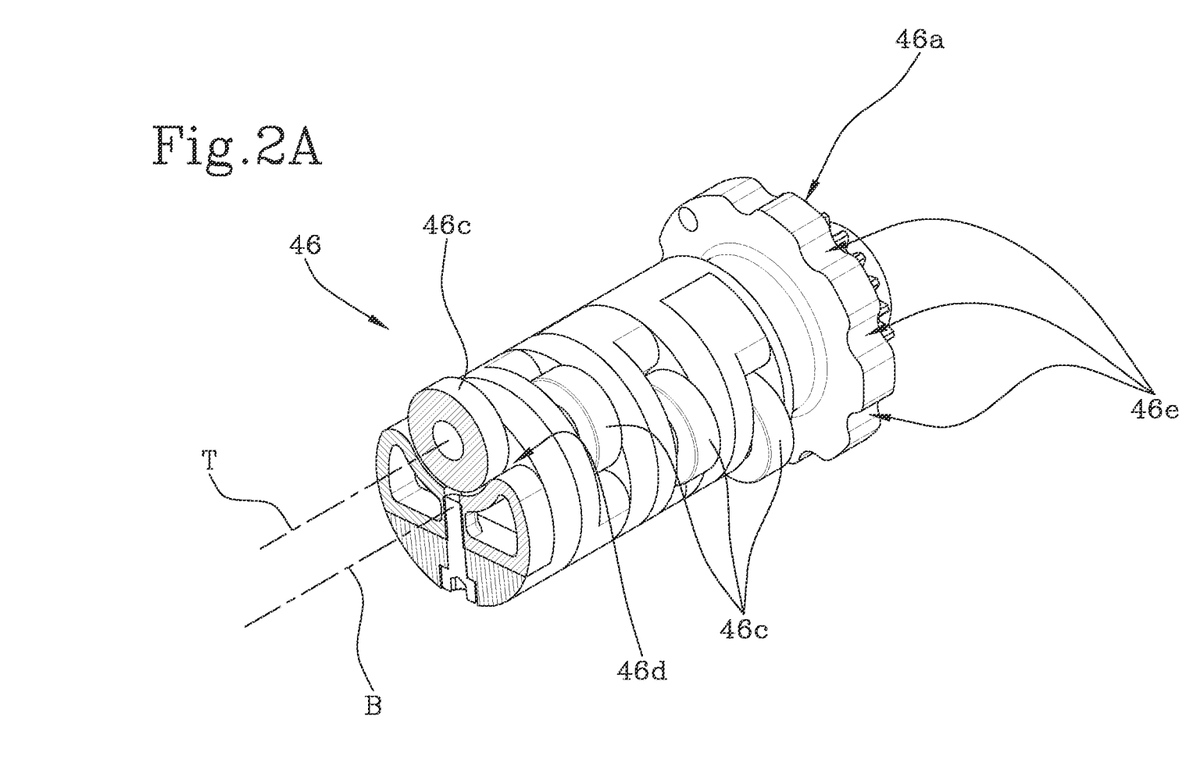
FIG. 2A is a schematic cross section perspective view of a component of the gear-shifting device of FIG. 2.

With reference to FIGS. 2 and 2A, the drum 46 has at a relative end a movement element 46a fixed to the drum and designed to rotate the drum 46 about its axis "B".

Preferably, the drum 46 comprises on its outside surface a plurality of rotary elements 46c such that they interact with respective slowing disks 45 present on the tertiary shaft 30.

Preferably, the rotary elements 46c comprise contact members (also labelled 46c) housed in slots 46d distributed along the outer surface of the drum 46 according to a predetermined order.

Preferably, the slots 46d are made by machining a solid piece of material and then fixed on the drum 46 by means of threaded fixing systems.

In a different embodiment, the slots 46d are made on the drum 46 by machining directly on the cylindrical body of the drum 46.

Preferably, the contact members 46c are cylindrical and rotatably connected to the drum 46 in such a way as to rotate about a respective axis of rotation "T" parallel to the axis of rotation "Z" of the tertiary shaft 30 and, therefore, also to the axis "B" of the drum 46, according to this embodiment.

Preferably, the axes of rotation "T" of the contact members 46c are located at a radial distance relative to the axis of rotation "B" of the drum 46 in such a way that the contact members 46c protrude from the outer surface of the rotary drum 46 by a distance as a percentage of its diameter.

Preferably, the contact members 46c are angularly divided symmetrically about the axis of rotation "B" of the drum 46. Still more preferably, the contact members 46c are spaced along the axis of rotation "B" according a distance equal to the distance of the gear wheels 33 present on the tertiary shaft 30.

In other words, the contact members 46c of the drum 46 are housed on it in such a way as to be positioned at the gear wheels 33, during an operating configuration of the device 1. More specifically, each contact member 46c of the drum 46 is positioned at a respective slowing disk 45.

Preferably, each contact member 46c is positioned along a spiral trajectory such as to be wrap along the outer surface of the rotary drum 46 for example until completing a round angle between an initial end and a final end.

In a different embodiment, not illustrated and included in the inventive concept of the invention, the arrangement of the contact members 46c on the outer surface of the cylinder is adjusted according to a different type of trajectory, for example according to an alternating sequence of a certain number of contact members 46c repeated consecutively along the extension of the drum 46 along the axis of rotation "B".

With reference to the above-mentioned slowing discs 45, in detail with a single example in FIG. 4, each of them has along the perimeter edge 45a a portion of a deformable material.

Preferably, the deformable material is represented by an annular element 45b of plastic material (preferably rubbery) for example having a circular cross section.

Preferably, the perimeter edge 45a of the disk 45 has a shaped seat 45c designed to house by forced insertion the above-mentioned annular element 45b. The annular element 45b may be made of a rubber-based material or a material having mechanical and physical characteristics similar to rubber (silicone, polyurethane, etc.).

Advantageously, the perimeter edge 45a of each disk 45 (and more specifically the deformable material) is such as to produce, by a rolling contact with the contact member 46c associated with it, a deformation such as to generate a transient difference in speed of rotation time between the disk 45 and the respective gear wheel 33, during an operating configuration of the device 1. This condition is illustrated in FIG. 5. In addition, the rolling contact with the contact member 46c also creates a friction force such as to generate a transient difference in speed of rotation of the gear wheel 33 selected and associated with the respective disc 45 and the tertiary shaft 30, during an operating configuration of the device 1.

It should be noted that, during the operating condition, the rolling contact between the contact member 46c and the deformation portion of the disk 45 generates a slowing down of the latter relative to the respective gear wheel 33 and moves the disk 45 from the first position to the second position. This movement defines a radial movement of the engagement element 41 which engages in the tertiary shaft 30 (at the seats 43) for generating a rotation of the gear wheel 33 integral with the tertiary transmission shaft 30.

Advantageously, the presence of the annular element 45b made from deformable material avoids the use of friction braking means acting on the disk 45 and, therefore, considerably reduces the generation of dust and the consumption of the braking means. In effect, in this invention, the rotary unit 46c deforms the annular element 45b thereby resulting in a slowing down, but the rotary unit 46c continues to rotate moved by the disc 45.

Preferably, the pick up element 41 is located inside each gear wheel 33 and the elastic element 42 is located inside the slowing disk 45. In addition, the cavities 43 are positioned along the tertiary shaft 30 at the position of the gear wheels 33.

The other gear wheels 30 of the tertiary shaft 33 rotate freely relative to it being in a non-selected configuration of the gear wheel 33.

Preferably, the gear wheels 33 and the discs 45 are coaxial with each other along the tertiary shaft 30.

In use, the change of a transmission ratio of the device 1 means that initially the tertiary shaft 30 is rotated by the secondary shaft 20 by the engagement which has already occurred and is active of the engagement element 41 between a specific gear wheel 33 and the tertiary shaft 30.

In this condition, the contact member 46c at the selected gear wheel 33 is in rolling contact on the annular element 45b of the slowing disk 45 creating and maintaining a resistant torque such as to keep engaged the engagement element 41 and, therefore, the mechanical connection between the gear wheel 33 and the respective tertiary shaft 30.

The subsequent rotation of the drum 46 in a new angular position means that the contact member 46c previously inserted on a slowing disk 45 moves away from it with a trajectory "R" of its axis of rotation "T" which is tangential to the axis of rotation "B" of the drum 46 and lies on a plane perpendicular to the axis of rotation "B" of the drum 46 (that is, the plane of FIG. 5). In the same way, a new contact member 46c enters into rolling contact with a respective annular element 45b of a slowing disk 45 belonging to the new selected gear wheel 33.

During angular re-positioning of the drum 46, the gear wheel 33, as it is no longer slowed down by the respective slowing disks 45 and the contact member 46c, returns again to being uncoupled from the rotation of its own tertiary shaft 30, whilst a new gear wheel 33 is selected (a new transmission ratio is established).

A new transmission ratio is established by an approach movement of a contact member 46c, different from the previous one, along a trajectory "R" of its axis of rotation "T" positioned tangentially to the axis of rotation "B" of the drum 46, towards the new slowing disk 45 associated with the new selected gear wheel 33.

Each angular position adopted by the drum 46 following a rotation along the axis "B" corresponds to the insertion of a transmission ratio between the secondary shaft 20 and the tertiary shaft 30 following application of a slowing down of the slowing disk 45 relative to the respective gear wheel 33.

Therefore, the selection by a user of a transmission ratio on the output 32 of the device 1, identifies a precise and unique angular position of the rotation drum 46 so that the contact member 46c allows the insertion of the above-mentioned ratio.

With reference to the rotation of the drum 46 and to the unique and precise identification of the angular position of the rotary drum 46, the movement element 46a may comprise a cylindrical portion having along the perimeter edge a plurality of hollows 46e numerically equal to the number of gear wheels 33 comprised in the set of the tertiary shaft 30 and therefore numerically equal to the number of transmission ratios which can be achieved by using the device 1 (see in particular FIGS. 2 and 2A).

Preferably, the hollows 46e of the movement element are designed to interact with a position sensor, for example made from a linkage having one end equipped with a roller and an arm connected to an electronic micro-switch in such a way as to switch it according to a predetermined operating condition.

Preferably, the movement element 46a comprises a gear wheel for engaging with another gear wheel, for example, connected to the shaft of an electric motor designed for moving and positioning the drum 46. The electric motor may be of a brushless, DC or stepping motor type.

In one embodiment not illustrated in the accompanying drawings and covered in the scope of this invention, the gear-shifting device 1 comprises a pair of shafts 100 each comprising a plurality of transmission units 200 and where each transmission unit 200 of a shaft is rotated by a respective transmission unit 200 of the other shaft.

Preferably, with reference to the embodiment described above and shown in the accompanying drawings, the above-mentioned pair of shafts 100 is represented for a shaft of the pair 100 by the secondary shaft 20 and for the other shaft of the pair 100 by the tertiary shaft 30.

For this reason, according to this embodiment, the transmission units 200 of the pair of shafts 100 are represented respectively by the gear wheels 21 of the secondary shaft 20 and by the gear wheels 33 of the tertiary shaft 30.

According to a solution of this embodiment, the tertiary shaft 30 is the tertiary shaft, comprising therefore the activation means 40.

The activation means 40 are configured in such a way as to selectively rotate in an integral fashion a gear wheel 21 of the secondary shaft 20 with a gear wheel 33 of the tertiary shaft 30 by generating a transient difference in speed of rotation between the slowing disk 45 and the selected gear wheel 33.

Preferably, the gear wheels 30 of the tertiary shaft 33 rotate freely relative to the tertiary shaft 30 in a non-selected configuration of the gear wheel 33 and respective slowing disk 45.

In a different embodiment, not illustrated in the accompanying drawings and covered in the scope of this invention, the activation/deactivation of the coupling system with reversible connection is achieved by means of a linkage such as to rotate/suspend an integral rotation of a transmission unit with a tertiary shaft in an operating condition of the device 1.

In other words, the activation means comprise a system of levers driven by an actuator (for example, of electrical or hydraulic type) which allows the selective insertion of the gear wheel of the tertiary shaft with the respective gear wheel of the shaft associated with it.

With reference to FIG. 6, preferably, the device 1 according to this invention may also comprise an electric motor 60 (for example, in the case of an electric bicycle), powered by an electrical source outside the device 1, such as to contribute at least partly to the movement of the transmission means 200 in an operating condition of the device 1.

The electric motor 60 is operatively connected at an end of the secondary shaft 20 and helps the user to move the tertiary shaft 30 when a pair of gear wheels 21, 33 has been selected.

Preferably, the electric motor 60 is configured to follow a constant value of drive torque on the shaft secondary 20 (and, consequently, also on the input 11 of the device 1) so that a user always exerts the same force on the pedal cranks 300 irrespective of the load (power necessary) which the drive wheel of a bicycle sends to the output 32 of the device 1 during an operating configuration of the bicycle.

Preferably, the electric motor 60 is of the brushless type in such a way that by use of an electronic type control system the torque delivered and the speed of rotation of the motor can be controlled instantaneously. Still more preferably, under certain operating conditions of the device 1 where there is a significant imbalance between load (very low) and power available (much greater than the load), the motor can act as an electricity generator for generating electricity to be sent, for example, to a rechargeable electric battery and, therefore, produce a reaction torque on the pedals in such a way that the user is always physically engaged in the same way during pedalling.

In accordance with the scope of the inventive concept, a bicycle and a gear-shifting device 1 comprising one or more of the features described above is defined.

Preferably, the electric bicycle also comprises means for selecting a transmission unit 200 of the device 1 for changing the speed of the bicycle.

Preferably, the selecting means comprise a mechanical type drive connected to the movement element 46a of the drum 46 of the device 1. For example, the selection of the transmission ratio of the device 1 is controlled by a flexible linkage of a metallic wire type with a sheath (preferably of the type with a double wire, that is to say, a system of the "push-pull" type) fixed on the handlebars of the bicycle and connected directly to the movement element 46a of the drum 46. The system may comprise one or more levers on the handlebars with a snap-on locking system for setting up and fixing the stroke of the metallic wire connected to the drum 46 and, therefore, the angular position of the drum 46. This solution is not shown in the accompanying drawings.

The position set up for the drum 46 following the selection of a particular transmission ratio is, for example, detected by a micro-switch 61 (shown in FIG. 2) which perceives that the information interacting with a hollow 46e of the movement element 46a of the drum 46.

Preferably, the micro-switch 61 is connected by electrical wiring to a small electronic display, positioned in view of a user of the bicycle, to provide information regarding the transmission ratio inserted at that moment.

Moreover, the above-mentioned display unit may be able to show information relative to an average value of the energy expended to reach a predetermined speed of travel measured, the time of travel and the distances covered (total and partial) and so on.

In a different embodiment of the selecting means of the bicycle, instead of being of a mechanical type they comprise an electric drive connected to the movement element 46a of the drum 46.

For example, the selecting means of an electric type preferably comprise an electric motor 500 of the brushless or DC or stepping type designed for meshing with a gear wheel present on the movement element 46a of the drum 46. The use of an electric motor 500 of the type brushless or DC or stepping type for moving the drum 46 allows a more precise and complete control with an electronic system which is preferably designed for processing an algorithm with self-adjustment functions depending on, for example, the style of a user in riding the bicycle.

Moreover, the brushless or DC or stepping electric motor 500 which moves the drum 46 can replace the micro-switch 61 in the event of its failure.

In an alternative embodiment, the above-mentioned bicycle may be of the electric type comprising an electric battery, for example of the rechargeable type.

Preferably, the bicycle comprises a gear-shifting device 1 equipped with an electric motor 60 as described above and still more preferably connected to the above-mentioned electric battery.

In that case, the information processed by the micro-switch 61 is sent to the control system (for example an integrated electric circuit) and used to control the electric motor 60 as a function of the transmission ratio set and the specific operating condition of the bicycle.

Advantageously, the gear-shifting device according to this invention allows a faster gear change, without transitional stages thus increasing the riding comfort for a bicycle user.

The much reduced times for inserting a transmission ratio for changing the speed of the bicycle are such as to allow the user to shift the ratio, for example, from a minimum multiplication value to a maximum value (or vice versa) in a short instant in such a way as to no longer having to accompany the gear change by rotating with almost zero force the pedal cranks of the bicycle.

According to this invention, the gear shift times are directly proportional to the speed of rotation of the drum and/or to the dimensions of the drum.

Moreover, the angular distribution of the contact members along the drum also influences the shift times of the device according to this invention: the smaller the angular interval which separates a contact member from the next one, the shorter the shift time will be, so the greater the number of contact members present on the drum the shorter the shift time could be.

The device according to this invention has a greater number of gear wheels thanks to the compactness of the mechanical solutions adopted, for example of the activation means.

Advantageously, the greater number of gear wheels in the device according to this invention allows a user of the bicycle (and/or of the electric bicycle) to insert a greater number of transmission ratios compared with the prior art.

Advantageously, the electric motor of the "brushless" type fitted to the electric bicycle according to this invention makes it possible to compensate for any transient imbalances between the available torque (power), supplied to the primary shaft by a user while pedalling and the necessary torque (power) required at the output hub of the device (or at the hub of the drive wheel of the bicycle), in such a way as to further increase the riding comfort of a user who is not forced to accompany the gear change by rotating with almost zero force the pedal cranks of the electric bicycle.

Advantageously, the use of the electric bicycle according to this invention allows an excessive force at a relatively steep slope to be compensated, which a user would otherwise have to overcome independently.

Advantageously, the control system of the electric system and the brushless motor of the bicycle allow an operation with recovery of energy during the braking and/or slowing down of the bicycle in such a way as to recharge the batteries on board, thereby increasing their duration.

Advantageously, the generation of a resistant torque given by the sliding friction to perform the gear change, gives the device according to this invention greater mechanical efficiency and increased reliability and duration of the mechanical components compared with the prior art.

Moreover, a simple and rational structure of the device means that at least some shafts (between primary, secondary and tertiary) can be removed individually from the main casing of the device, allowing faster and less costly maintenance relative to the prior art.

Advantageously, the device according to this invention does not require a regular adjustment and/or calibration of the respective mechanisms: in effect, after setting up and carrying out a brief testing of the mechanisms during production assembly, it is no longer necessary to perform any corrective action, which was, on the other hand, necessary for traditional devices since there is no transversal movement for inserting the transmission ratios.

The invention claimed is:

1. A gear-shifting device (1) for means of transport comprising:
a pair of shafts (20-30) parallel to and spaced from each other each comprising a plurality of transmission units (200), each transmission unit (200) of a tertiary shaft (30) being driven to rotate by a respective transmission unit (200) of the other shaft (20), the transmission units (200) of the other shaft (20) rotating integrally with the other shaft (20); the transmission units (200) of the tertiary shaft (30) being arranged according to a predetermined sequence along an axis (Z) of rotation of the tertiary shaft (30) and each transmission unit (200) of the tertiary shaft (30) being rotatable on itself about the axis (Z); each transmission unit (200) of the tertiary shaft (30) being positioned axially at a respective transmission unit (200) of the other shaft (20) and meshing together in such a way as to establish a predetermined transmission ratio between the other shaft (20) and the shaft (30); each transmission unit (200) of the tertiary shaft (30) being configurable between a non-selected condition in which the transmission unit (200) of the tertiary shaft (30) is freely rotatable about the tertiary shaft (30) and a selected condition in which the transmission unit (200) of the tertiary shaft (30) is rotatably integral with the tertiary shaft (30);
activation means (40) operatively associated with the tertiary shaft (30) and the transmission units (200) of the tertiary shaft (30) for selectively rotating in an integral fashion a transmission unit (200) of the tertiary shaft (30) with the tertiary shaft (30); the activation means (40) comprising a plurality of slowing disks (45) each operatively connected to a respective transmission unit (200) of the tertiary shaft (30); each slowing disk (45) being rotatably mobile relative to the respective transmission unit (200) around the tertiary shaft (30) between a first position and a second position; each slowing disk (45) being configured in such a way as to selectively rotate in an integral fashion the respective transmission unit (200) with the tertiary shaft from the non-selected condition to the selected condition by generating a transient difference in the speed of rotation between the transmission unit (200) selected and the respective slowing disk (45) in such a way as to bring the slowing disk (45) from the first position to the second position;
each slowing disk (45) comprising along a perimeter edge (45a) of the slowing disk (45), a portion made of at least one deformable material;
the device (1) comprising at least one rotary unit (46c) operatively mobile towards a slowing disk (45) for deforming the portion of deformable material in such a way as to generate the transient speed difference.

2. The device (1) according to claim 1, wherein the activation means (40) also comprise a drum (46) rotating about an axis (B), the drum (46) comprising on an outer surface of the drum (46), a plurality of rotary units (46c) each in a position such that each rotary unit (46c) interacts with a respective slowing disk (45) for generating the deformation of the portion of deformable material.

3. The device (1) according to claim 2, wherein the rotary units (46c) are angularly divided about the axis of rotation (B) of the drum (46) and are spaced along the axis of rotation (B) according to a distance equal to the distance between the slowing disks (45) of the tertiary shaft (30).

4. The device according to claim 2, wherein the rotary units (46c) are positioned on the outer surface of the drum (46) along a spiral trajectory wrapped around the outer surface of the drum (46) in the direction of the axis of rotation ("B") of the drum (46).

5. The device (1) according to claim 2, wherein each rotary unit (46c) is structurally separate from the drum (46) and wherein the drum (46) comprises slots (46d) housing the rotary units (46c) distributed along the outer surface of the drum (46).

6. The device (1) according to claim 2 wherein the rotary units (46c) are cylindrical and rotate relative to respective axes of rotation ("T") which are parallel with the axis of rotation ("B") of the drum (46) and which are positioned at a radial distance from the axis of rotation ("B") of the drum (46) in such a way that the rotary units (46c) project from the outer surface of the drum (46).

7. The device (1) according to claim 2, wherein the drum (46) comprises a movement element (46a) comprising a cylindrical portion having along a perimeter edge of the cylindrical portion, a plurality of hollows (46e) in a number equal to the number of the rotary units (46c) housed on the drum (46) and allowing identification of the angular position adopted by the drum (46).

8. The device (1) according to claim 7, wherein the gear-shifting device (1) also comprises a micro-switch (61) for perceiving information about the angular position of the drum (46) by means of the interaction of a portion of the micro-switch (61) in a hollow (46e) of the movement element (46a) of the drum (46).

9. The device (1) according to claim 1, wherein the activation means (40) comprise a coupling with reversible connection acting between the transmission unit (200) of the tertiary shaft (30) and the tertiary shaft itself, the coupling with reversible connection being kept in a disconnected state by a disconnecting force in a configuration in which the transmission unit (200, 33) is not selected.

10. The device (1) according to claim 9, wherein the coupling with reversible connection is designed to be activated by a deformation force, generated by the respective rotary unit (46c) on the portion of the slowing disk (45), and such that the deformation force exceeds the disconnecting force in an operating condition of the transmission unit (200) selected.

11. The device (1) according to claim 1, characterised in that the device (1) comprises a primary shaft (10) driven by a pair of external forces acting on an input (11) of the device (1) and a secondary shaft (20) driven by the primary shaft (10), and the tertiary shaft (30) which is driven, during the integral rotation of a rotation unit (200), by the secondary shaft (20) and comprising an output (32) of the device (1), wherein the tertiary shaft (30) coincides with the tertiary shaft and the secondary shaft coincides with the other shaft (20).

12. The device (1) according to claim 1, characterised in that the transmission means (200) of the other shaft (20) are arranged according to a predetermined sequence along an axis (Y) of the other shaft (20); the transmission units (200)

being keyed on the other shaft (20) in such a way as to be constantly rotatable in an integral fashion with the other shaft (20).

13. The device (1) according to claim 1, characterised in that each transmission unit (200) of the tertiary shaft (30) rotates around the axis (Z), during the selected condition, together with the corresponding slowing disk (45).

14. A bicycle comprising:
   a gear-shifting device (1) of the bicycle according to claim 11;
   means for selecting a transmission unit (200, 21, 33) for changing the speed of the bicycle;
   two pedal cranks, each connected to the input (11) of the primary shaft (10) for defining a pair of external forces.

15. The device (1) according to claim 2, wherein the rotary units (46*c*) are angularly divided symmetrically about the axis of rotation (B) of the drum (46) and are spaced along the axis of rotation (B) according to a distance equal to the distance between the slowing disks (45) of the tertiary shaft (30).

16. The device (1) according to claim 7, wherein the gear-shifting device (1) also comprises a micro-switch (61) for perceiving information about the angular position of the drum (46) by means of the interaction of a portion of the micro-switch (61) in a hollow (46*e*) of the movement element (46*a*) of the drum (46), the micro-switch (61) being connected to and interacting with an electric motor (500).

17. The device (1) according to claim 1, wherein the activation means (40) comprise a coupling with reversible connection acting between the transmission unit (200) of the tertiary shaft (30) and the tertiary shaft itself, the coupling with reversible connection being kept in a disconnected state by a disconnecting force of the elastic type, in a configuration in which the transmission unit (200, 33) is not selected.

* * * * *